July 16, 1957 N. CORDIS Re. 24,337

MILKING APPARATUS

Original Filed March 20, 1944 2 Sheets-Sheet 1

INVENTOR
NAT CORDIS
BY: Everett A. Johnson
ATTORNEY

July 16, 1957 N. CORDIS Re. 24,337

MILKING APPARATUS

Original Filed March 20, 1944 2 Sheets-Sheet 2

Inventor:
Mat Cordis

By: Ernest A. Johnson
Attorney.

United States Patent Office

Re. 24,337
Reissued July 16, 1957

24,337

MILKING APPARATUS

Nat Cordis, Silver Lake, Wis.

Original No. 2,509,214, dated May 30, 1950, Serial No. 527,220, March 20, 1944. Application for reissue March 16, 1956, Serial No. 572,187

3 Claims. (Cl. 119—14.09)

Matter enclosed in heavy brackets [ ] appears in the original patent but forms no part of this reissue specification; matter printed in italics indicates the additions made by reissue.

The invention relates to improvements in a milk loading apparatus and has for its object the provision of an improved milk loading apparatus which is of simple construction and highly efficient in use.

Another object of the invention is the provision of milk loading apparatus so constructed and arranged as to effect the immediate cooling of the milk after extraction.

Other objects will appear hereinafter.

The invention consists of the combinations and arrangements of parts hereinafter described and claimed.

Figure 1:
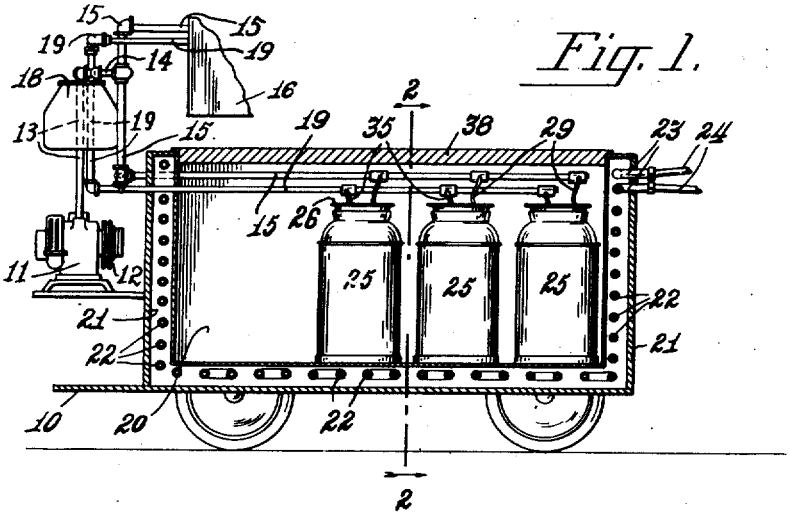
Figure 2:
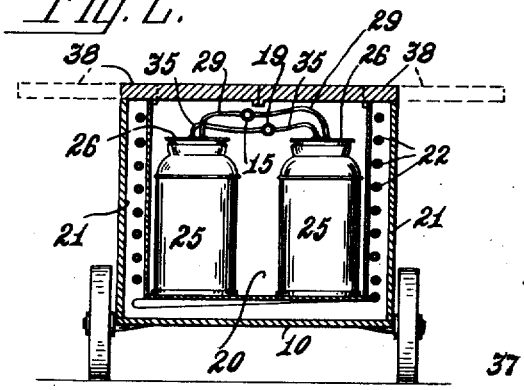
Figure 3:
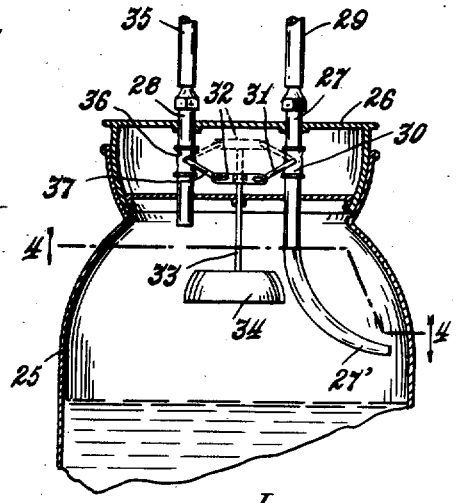
Figure 4:
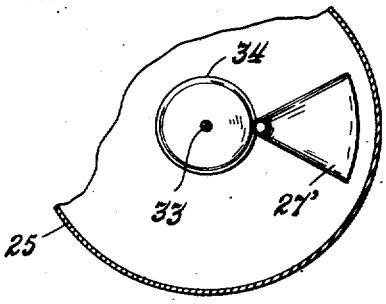
Figures 5, 6:
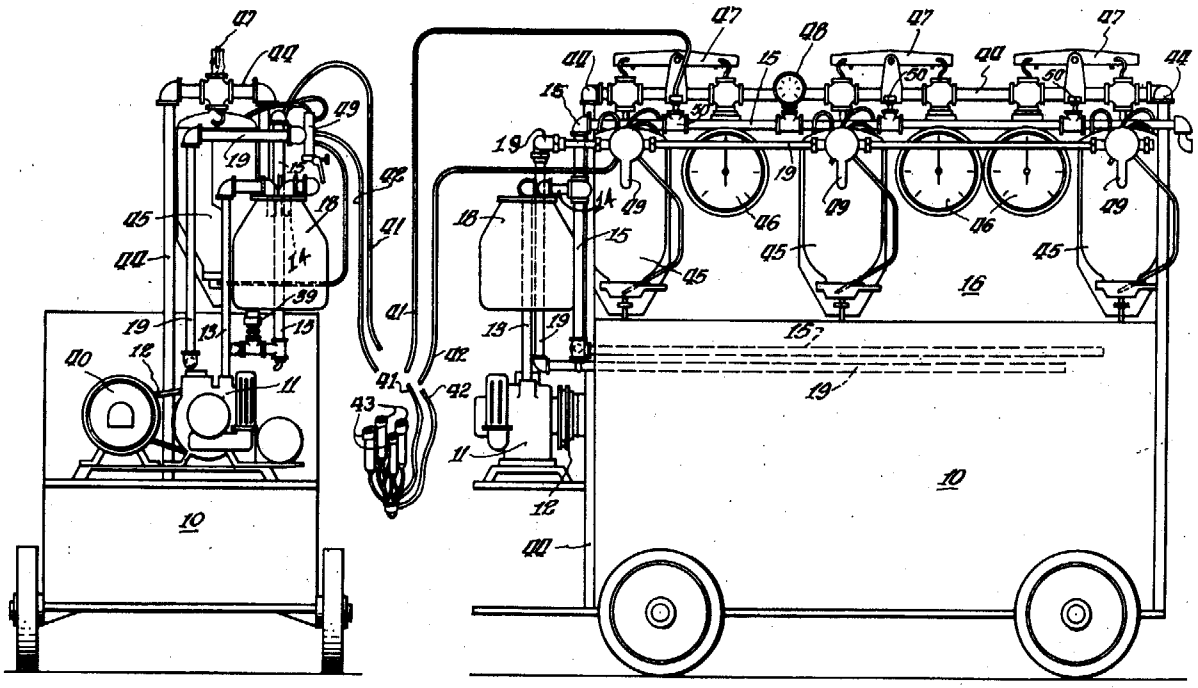

The invention will be best understood by reference to the accompanying drawings forming a part of this specification and in which:

Fig. 1 is a partial longitudinal section of a vehicle equipped with milking apparatus embodying the invention;

Fig. 2, a transverse section taken substantially on line 2—2 of Fig. 1;

Fig. 3, an enlarged detailed section taken through the upper portion of one of a plurality of milk containers employed in the apparatus;

Fig. 4, a section taken substantially on line 4—4 of Fig. 3;

Fig. 5 is an end view of the vehicle shown in Fig. 1 equipped with a conventional receptacle carrying appurtenances incidental to milking operations; and Fig. 6 is a side view of Fig. 5, showing milking appurtenances as arranged for use.

The embodiment of the invention illustrated in the drawings comprises a suitable wheeled wagon or vehicle 10 adapted and arranged to be readily moved to a position adjacent the stalls in which the animals to be milked are contained. Vehicle 10 is equipped with a suitable pump 11 operated by belting 12 from a suitable motor 40. The pump 11 is connected with a vacuum line 13 opening into a vacuum sediment trap 18, which is connected by a branch pipe 14 to vacuum line 15 as best shown in Fig. 6. A suitable casing 16 is provided in the upper portion of the vehicle 10 containing a supporting frame 44 which carries suitable milk holders 45 connected to scales 45 by means of scale eveners 47 in operable arrangement with vacuum gauge 48, control valves 49 and pulsator 50, and in operable association with the usual form of milk-extracting apparatus leading thereto and whereby milk will be extracted by means of teat cups 43 and delivered first to one of the milk holders 45 for weighing, and afterwards transferred through the milk carrying line 19 into a milk container 25 in the cooling chamber 20.

Referring particularly to Figs. 5 and 6 showing the arrangement of conventional milking-machine appurtenances for casing 16 as an adjunct to the cooling chamber 20 and comprises a motor 40 connected by a belt 12 to a pump 11, operating a vacuum line 13 extending upwardly from the pump 11 and connected to the branch vacuum line 14 (in the casing 16) carrying control valves 49, one for each milk holder 45. A supporting frame 44 suspends a suitable dial scale 46 connected to a scale evener 47 at one of its ends, a milk holder 45 being attached to the other end of said scale evener 47.

Vacuum line 15 (Fig. 5) is provided with a conventional vacuum relief valve 39. Milking hoses 41 and 42 are connected to vacuum line 15 and milk line 19, respectively, and to conventional teat cup assembly 43. The cooling chamber 20 is provided with hollow walls 21 in which are located cooling coils or pipes 22 having their ends 23 detachably connected with hose 24 and by means of which said coils 22 may be readily connected or disconnected from a central refrigerating system. The open space in the hollow walls 21 is filled with water or other cooling medium whereby the cooling chamber 20 may be readily and thoroughly cooled at a central refrigerating system and then detached therefrom and moved into operative relationship with the animals to be milked, as will be readily understood. The cooling chamber 20 is of a size and shape to receive a plurality of milk containers 25, each equipped with a lid or cover 26, by means of which the same may be hermetically sealed. Each cover 26 has two pipes 27 and 28 extending downwardly therethrough. The pipe 27 is laterally bent at its lower end and there flattened and spread into a delivery nozzle 27', arranged to deliver milk in a sheet-like stream directly against a wall of the container 25 and whereby the said milk will be instantly cooled when received. Each pipe 27 is detachably connected by means of a hose 29 with the milk-delivering pipe 19 and a suitable valve 30 operable by means of a crank arm 31 is provided in the pipe 27 for controlling the flow of milk therefrom. The arm 31 is connected with a cross head 32 at the top of a float stem 33 carried by a float 34 and whereby when the level in the container 25 reaches a predetermined point, the consequent elevation of the float 34 will operate the valve 30 to stop further flow of milk to that container.

Each pipe 28 is detachably connected by means of a hose 35 with the vacuum pipe 15 and is also equipped with a valve 36 and operating arm 37 connected to cross head 32, so that when the valve 30 is closed, the valve 36 will also be closed, thereby discontinuing the drawing of air from the container into the vacuum line 19 and thus more effectively discontinuing the flow of milk to the container. As each container is thus filled with milk, the next adjacent container likewise similarly receives milk and is filled and until all of the containers 25 are thus filled with milk, whereupon the operation is discontinued. The vehicle is then moved to the central refrigerating system and the containers 25 moved away from the cooling chamber 20 by opening the lids 38 thereof and are thus transferred to the refrigerating system for further attention in the usual way. Thus a milkloading apparatus is provided in which the milk will be instantly cooled upon extraction and thereby the multiplication of injurious bacteria therein prevented. The specific form and arrangement of parts illustrated is a simple and effective one for the purpose.

While I have illustrated and described the preferred form of construction for carrying the invention into effect, this is capable of variation and modification without departing from the spirit of the invention. I therefore do not wish to be limited to the precise details disclosed, but desire to avail myself of such variations and modifications as fall within the scope of the appended claims.

I claim:

[1. A milk loading apparatus comprising a vehicle body; a compartment within said body; closure means for said compartment; one or more hermetically sealed containers arranged within said closed compartment;

means for operatively connecting any one or all of said sealed containers with a supply of milk carrying animal heat; a heat-absorbing media arranged to extend out from said compartment within said vehicle body; cooling means on and transported with said body equipped with means for detachably connecting said cooling means with refrigerator means whereby one or more milk containers can be arranged to be automatically cooled by said cooling means; milk flow control means on said body; and conduit means on said body for delivery of said milk to said container or containers within said compartment.]

2. A milk loading apparatus comprising a vehicle body; a compartment within said body; closure means for said compartment; a hermetically sealed container arranged within said closed compartment; means for operatively connecting said sealed container with a supply of milk carrying animal heat; a heat absorbing media arranged externally of said compartment within said vehicle body; cooling means for said heat absorbing media equipped with means for detachably connecting said cooling means with refrigerator means; milk flow control means on said body; and conduit means on said body for delivery of said milk to said hermetically sealed container within said compartment.

3. The construction specified in claim 2 in which nozzle means is provided within the hermetically sealed container to direct the incoming stream of milk against the inner wall of said container.

*4. A milk loading apparatus comprising a vehicle body;*

*a compartment within said body; closure means for said compartment; one or more hermetically sealed containers arranged within said closed compartment; means for operatively connecting any one or all of said sealed containers with a supply of milk carrying animal heat; a heat-absorbing media arranged to extract heat from said compartment within said vehicle body; cooling means on and transported with said body equipped with means for detachably connecting said cooling means with refrigerator means whereby one or more milk containers can be arranged to be automatically cooled by said cooling means; milk flow control means on said body; and conduit means on said body for delivery of said milk to said container or containers within said compartment.*

References Cited in the file of this patent or the original patent

UNITED STATES PATENTS

| | | |
|---|---|---|
| Re. 23,543 | Duncan | Sept. 2, 1952 |
| Re. 23,544 | Duncan | Sept. 2, 1952 |
| 511,239 | Hill | Dec. 19, 1893 |
| 1,536,634 | Shippert et al. | May 5, 1925 |
| 1,825,645 | Martin | Sept. 29, 1931 |
| 2,006,393 | Hapgood | July 2, 1935 |
| 2,016,377 | Krotzer | Oct. 8, 1935 |
| 2,293,041 | Borden | Aug. 18, 1942 |
| 2,365,024 | Thomas | Dec. 12, 1944 |